Feb. 23, 1960

J. P. LINDSEY 2,926,249

NORMAL DENSITY FUNCTION FILTER

Filed March 29, 1957

INVENTOR.
J. P. LINDSEY

BY Hudson & Young

ATTORNEYS

Feb. 23, 1960 J. P. LINDSEY 2,926,249
NORMAL DENSITY FUNCTION FILTER
Filed March 29, 1957 5 Sheets-Sheet 2

INVENTOR.
J. P. LINDSEY
BY Hudson & Young
ATTORNEYS

Feb. 23, 1960  J. P. LINDSEY  2,926,249
NORMAL DENSITY FUNCTION FILTER
Filed March 29, 1957  5 Sheets-Sheet 3

INVENTOR.
J. P. LINDSEY
BY Hudson & Young
ATTORNEYS

INVENTOR.
J. P. LINDSEY
BY Hudson & Young
ATTORNEYS

United States Patent Office

2,926,249
Patented Feb. 23, 1960

2,926,249

NORMAL DENSITY FUNCTION FILTER

Joe P. Lindsey, Bartlesville, Okla., assignor to Phillips Petroleum Company, a corporation of Delaware Application March 29, 1957, Serial No. 649,449

6 Claims. (Cl. 250—27)

This invention relates to a normal density function filter which is particularly useful in the interpretation of seismic signals.

Seismic exploration refers to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot holes. The vibrations incident upon the seismometers are converted into corresponding electrical signals which are amplified and recorded. By noting the relative arrival times of selected reflected vibrations in a plurality of records, it is possible to obtain valuable information regarding the depth and slope of subterranean reflecting beds. However, extraneous vibrations usually are present in the recorded records which tend to obscure the recognition of the desired reflected signals. In order to minimize these extraneous vibrations, a number of systems have been proposed which include electrical tuning networks and the combination of signals received from a plurality of seismometers. However, there are still large areas where it is possible to obtain accurate information by seismic exploration because of the noise vibrations.

In the copending application of R. G. Piety, Serial No. 612,468, filed September 27, 1956, now Patent Number 2,888,089, there is disclosed an improved method of seismic exploration wherein the seismic records are transformed in a manner so that common reflections in a plurality of records are readily identifiable. This method involves establishing two electrical signals which are representative of the reflections received by at least two seismometers. The two signals are rectified so that the positive and negative portions of both are separated. The positive portions of the two signals are multiplied by one another and the negative portions of the two signals are multiplied by one another. The product of the negative portions of the two signals is subtracted from the product of the positive portions of the two signals to obtain a transformed signal. This signal then is filtered to provide a smooth output signal. It has been found that seismic signals transformed in accordance with this method provide a record which permits identification of desired reflections even in the presence of a large amount of random noise vibrations.

In accordance with the present invention, there is provided a filter which is particularly adapted to provide the above-mentioned smooth output signal. This filter has a response to a signal input pulse which closely approximates a normal density function. The filter effectively removes high frequency energy with no appreciable phase distortion.

Accordingly, it is an object of this invention to provide an improved filter which is capable of removing high frequency energy with no appreciable phase distortion.

Another object is to provide a filter which has a response to a single input pulse which approximates a normal density function.

A further object is to provide a filter which has the above-mentioned properties and which is provided with smooth tuning adjustment means.

Other objects, advantages and features of this invention should become apparent from the following detailed description which is taken in conjunction with the accompanying drawings in which.

Figure 1:
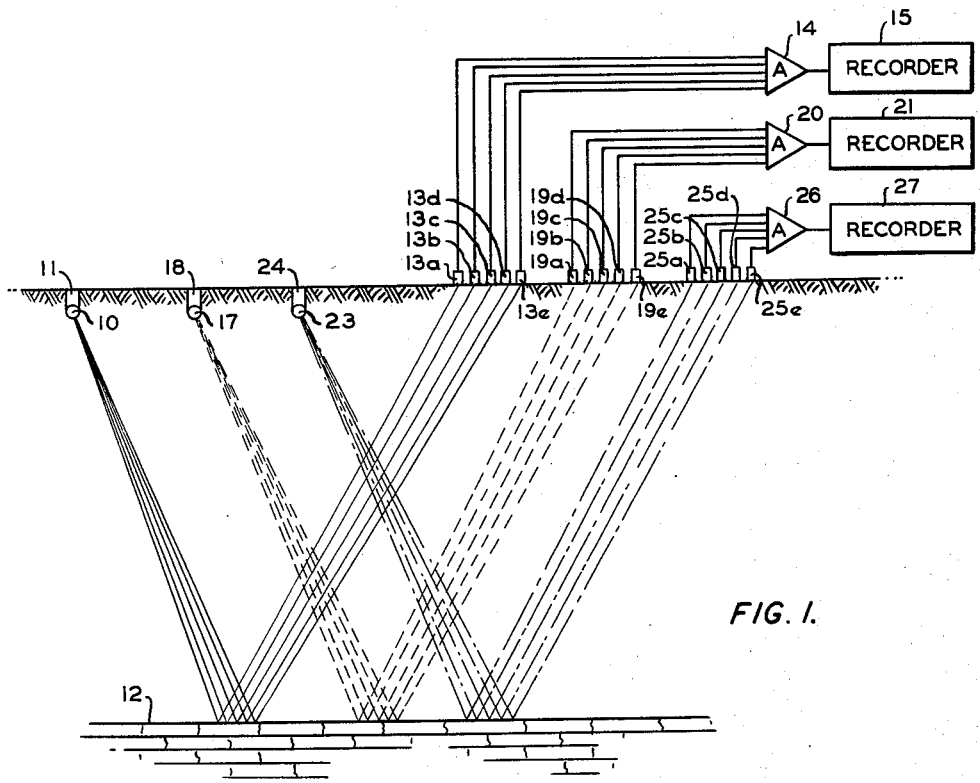
Figure 1 is a schematic representation of a seismic exploration procedure.

Referring now to the drawing in detail and to Figure 1 in particular, there is shown a seismic exploration system. A first explosive charge 10 is detonated in a shot hole 11. Vibrations emitted from this explosive charge are reflected from a subterranean formation 12 and are received by a plurality of seismometers 13a, 13b, 13c, 13d, and 13e which are spaced from one another and from shot hole 11. The output signals from these five seismometers are combined by a summing amplifier 14 and applied to a recorder 15. A second explosive charge 17 is subsequently detonated in a shot hole 18 which is spaced from shot hole 11. Vibrations emitted from explosive charge 17 are reflected by formation 12 and received by a plurality of second seismometers 19a, 19b, 19c, 19d, and 19e which are spaced from shot hole 18 and from the first set of seismometers. The signals received by this second group of seismometers are combined by summing amplifier 20 and applied to a recorder 21. A third explosive charge 23 is then detonated in a shot hole 24 which is spaced from shot hole 18. The vibrations emitted from this explosive charge are reflected from the formation 12 and received at a plurality of third seismometers 25a, 25b, 25c, 25d, and 25e which are spaced from shot hole 24 and from the second group of seismometers. The signals received by this third group of seismometers are combined by a summing amplifier 26 and applied to a recorder 27.

In the method illustrated in Figure 1, it is desirable that the shot holes be spaced equidistant from one another along a common line. The groups of seismometers are similarly spaced from one another along the same line. This procedure simplifies the record combining processes, but is not essential, as is pointed out hereinafter in detail. The procedure described in conjunction with Figure 1 is repeated with explosive charges being detonated in sequence in series of shot holes spaced from shot hole 24. This procedure will be described in conjunction with only three explosive charges in order to simplify the explanation and the drawing. However, in actual practice, a larger number of signals normally are obtained and combined.

Figure 2:
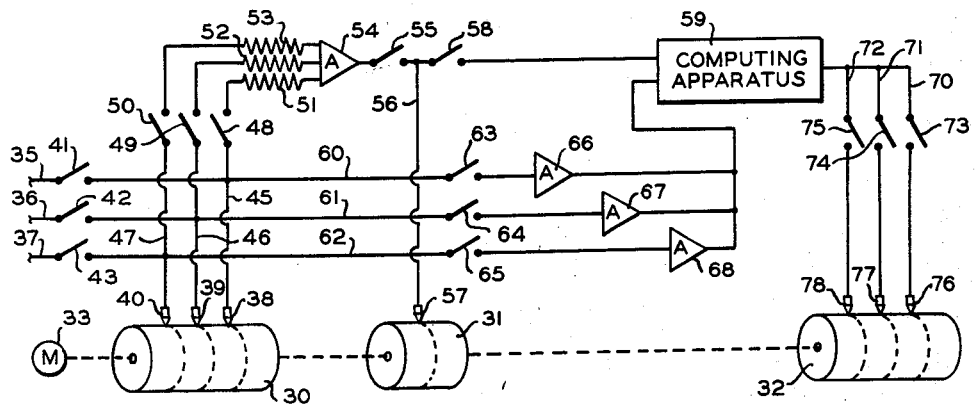
Figure 2 is a schematic view of recording and computing apparatus employed to transform the signals produced by the apparatus of Figure 1.
Figure 3:
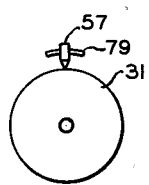
Figure 3 is an end view of one of the recording drums of Figure 2.

The recording and computing apparatus is illustrated schematically in Figure 2. It is desirable that the seismic signals be recorded initially on a magnetic tape because such a procedure enables the records to be manipulated readily. The recording apparatus of Figure 3 comprises drums 30, 31, and 32 which have magnetic tapes thereon and which are rotated by a motor 33. Although separate drums have been shown in the drawing, it should be evident that a single drum with a larger number of channels can be employed. The output signal from amplifiers 14, 20, and 26 of Figure 1 are connected by conductors 35, 36, and 37, respectively, to respective recording heads 38, 39, and 40 adjacent drum 30. Conductors 35, 36, and 37 have switches 41, 42, and 43, respectively, therein. The output signals of the three summing amplifiers are thus recorded initially on drum 30. In order to simplify the drawings, single conductors are illustrated. It should be evident that two conductors, or one conductor and ground, actually are employed.

It is desired that these three signals be summed to provide a composite record. Recording heads 38, 39, and 40 are connected by respective conductors 45, 46, and 47, which have respective switches 48, 49, and 50 therein, through respective isolating resistors 51, 52, and 53 to the inputs of a summing amplifier 54. The output of amplifier 54 is connected through a switch 55 and a conductor 56 to a recording head 57 adjacent drum 31. After the initial signals are recorded on drum 30, switches 41, 42, and 43 are opened and switches 48, 49, and 50 are closed. Drum 30 is rotated past heads 38, 39, and 40 which then function as reproducing heads so that the initial recorded signals are summed and recorded on drum 31. Switch 55 is closed at this time. The signal recorded on drum 31 is then combined with the individual signals originally recorded on drum 30. Head 57 of drum 31 is connected through conductor 56 and a switch 58 to the first input terminal of computing apparatus 59. Heads 38, 39, and 40 of drum 30 are connected by respective conductors 60, 61, and 62, which have respective switches 63, 64, and 65 therein, to the inputs of amplifiers 66, 67, and 68 respectively. The outputs of these amplifiers are connected to the second input of computing apparatus 59. The output of computing apparatus 59 is connected by conductors 70, 71, and 72, which have respective switches 73, 74, and 75 therein, to respective recording heads 76, 77, and 78 of drum 32.

The recording heads of drums 30 and 31 are adjustably mounted so that the signals originally recorded can be reproduced with selected time delays. This is illustrated schematically in Figure 3 where recording head 57 is shown attached to a curved support member 79 adjacent drum 31.

Figure 4:
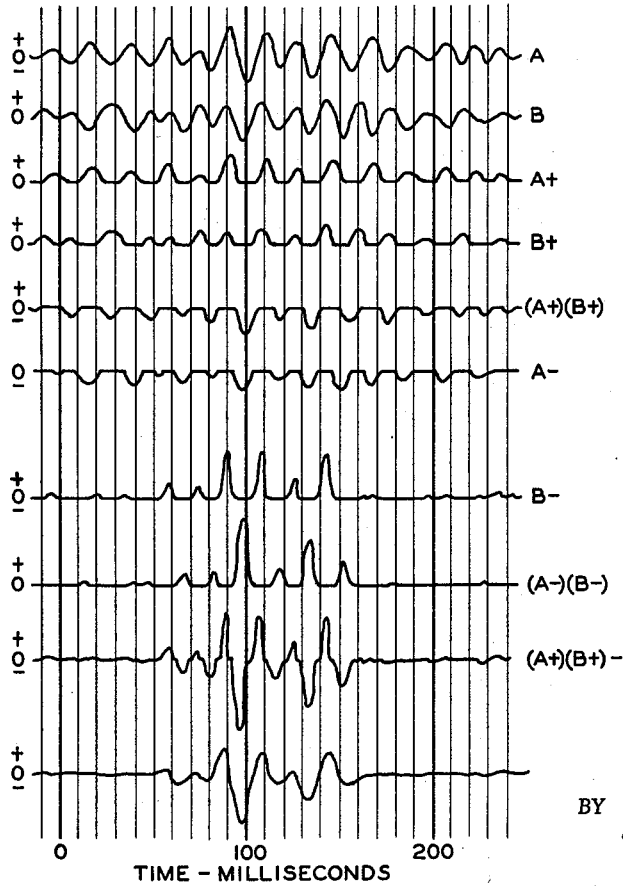
Figure 4 is a graphical representation of the rectification, multiplication, subtraction, and filtering steps performed by the apparatus of Figure 2.

The signal transforming procedure can be explained in conjunction with Figure 4. The several curves shown in Figure 4 represent electrical signals that correspond to the recorded and transformed seismic signals. Curve A represents a signal originally recorded on drum 31, for example. Curve B represents the signal originally recorded by head 38 on drum 30, for example. The two signals are rectified to provide the signals represented by the curves A+ and B+, respectively. These latter signals are multiplied to obtain the product (A+)(B+). Curves A and B are also rectified so as to obtain signals represented by the two negative curves A— and B—. These latter signals are multiplied to obtain the product (A—)(B—). This second product is then subtracted from the first product to obtain the quantity (A+)(B+)—(A—)(B—). The resulting signal is filtered to provide a smooth output signal as represented by the lowermost curve of Figure 4. As will become evident hereinafter, this process, when repeated, results in a series of transformed signals wherein common vibrations are readily identifiable.

Figure 5:
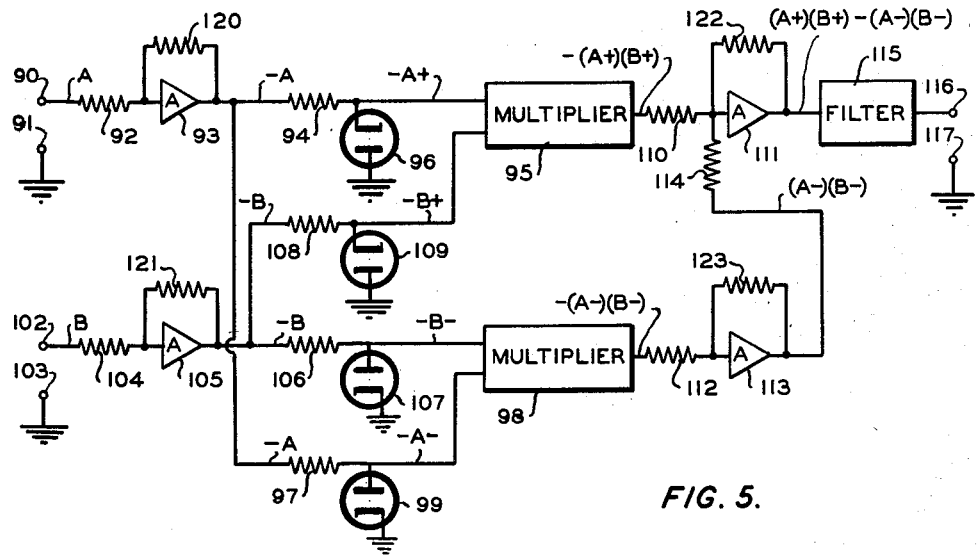
Figure 5 is a schematic circuit drawing of the computing apparatus of Figure 2.

The apparatus illustrated in Figure 5 is provided to carry out the rectification, multiplication, subtraction, and filtering steps illustrated in Figure 4. This computing apparatus is provided with first and second input terminals 90 and 91, the latter being grounded. Terminal 91 is connected through a resistor 92 to the first input of an amplifier 93. The output of amplifier 93 is connected through a resistor 94 to the first input of a multiplier circuit 95. A rectifier 96 is connected between the first input of multiplier circuit 95 and ground. The output of amplifier 93 is also connected through a resistor 97 to the first input of a second multiplier circuit 98. A rectifier 99 is connected between the first input of multiplier circuit 98 and ground. The computing apparatus is also provided with second input terminals 102 and 103, the latter being grounded. Terminal 102 is connected through a resistor 104 to the input of an amplifier 105. The output of amplifier 105 is connected through a resistor 106 to the second input of multiplier circuit 98. A rectifier 107 is connected between the second input of multiplier circuit 98 and ground. The output of amplifier 105 is also connected through a resistor 108 to the second input of multiplier circuit 95. A rectifier 109 is connected between the second input of multiplier circuit 95 and ground. The output of multiplier circuit 95 is connected through a resistor 110 to the input of a summing amplifier 111. The output of multiplier circuit 98 is connected through a resistor 112 to the input of an amplifier 113. The output of amplifier 113 is connected through a resistor 114 to the input of amplifier 111. The output of amplifier 111 is connected through a filter 115 to a first output terminal 116. The second output terminal 117 is connected to ground.

The amplifiers 93, 105, 111, and 113 can be conventional high gain electronic amplifiers which preferably are provided with degenerative feedback resistors 120, 121, 122, 123, respectively, to minimize distortion. In the illustrated embodiment of Figure 5, the output signals of these amplifiers are 180° out of phase with the corresponding input signals, as is provided with an odd number of vacuum tube amplifier stages. It should be observed that rectifiers 96 and 109 are connected with corresponding first polarities and that rectifiers 99 and 107 are connected with corresponding second polarities. It is assumed that the signals A and B of Figure 4 are applied to the respective inputs of the circuit of Figure 5. The output signals of amplifiers 93 and 105 are thus representative of —A and —B, respectively. The rectifiers 96 and 109 permit passage of only the positive portions of these signals, whereas rectifiers 107 and 99 permit passage of only the negative portions of these signals. Multiplier circuits 95 and 98 can be of the type described in Electronics, August 1956, page 182, for example. These circuits provide output signals which are representative of the products of the two input signals applied thereto. Amplifier 113 reverses the phase of the output of multiplier circuit 98 so that summing amplifier 111 performs the indicated subtraction. The several amplifiers are employed to provide sufficient gain to enable the signals to pass through the multipliers and filter.

Figure 6:
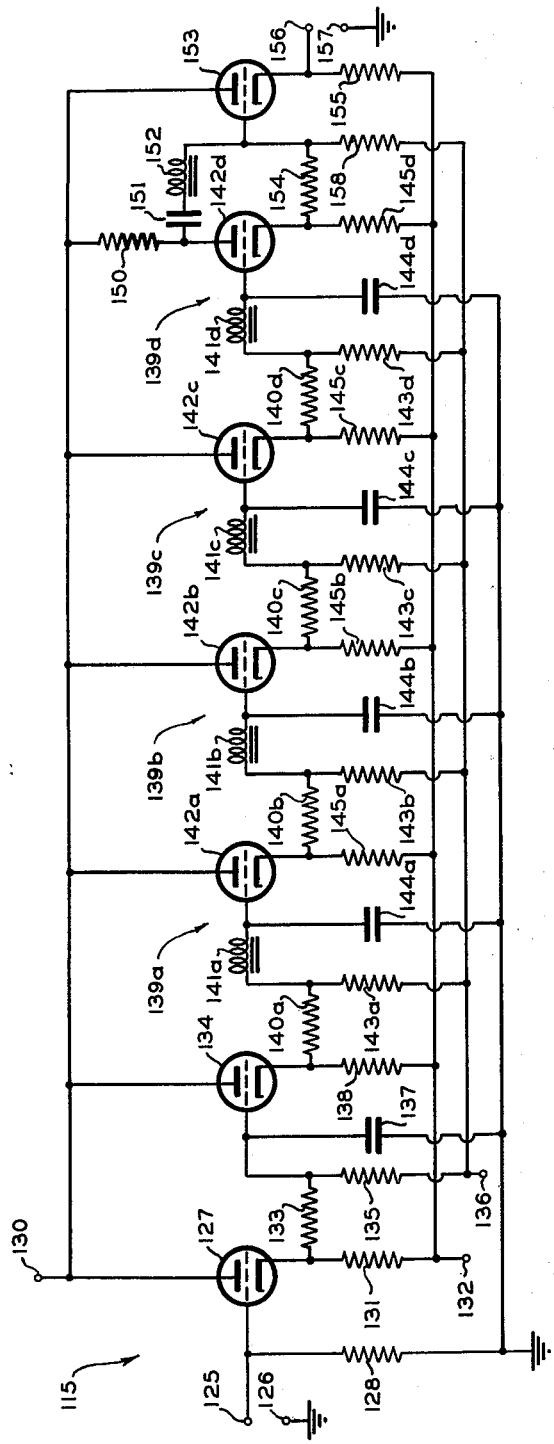
Figure 6 is a schematic circuit drawing of a first embodiment of the interpolation filter of this invention.

A first embodiment of the filter 115 of this invention is illustrated in Figure 6. The first input terminals 125 of this circuit is connected to the control grid of a triode 127. The second input terminals 126 is connected to ground. Terminal 125 is also connected to ground through a resistor 128. The anode of triode 127 is connected to a positive potential terminal 130, and the cathode of triode 127 is connected through a resistor 131 to a negative potential terminal 132. The cathode of triode 127 is connected through a resistor 133 to the control grid of a triode 134. The control grid of triode 134 is connected through a resistor 135 to a negative potential terminal 136 and to ground through a capacitor 137. The anode of triode 134 is connected to terminal 130, and the cathode of triode 134 is connected through a resistor 138 to terminal 132.

Four identical filter networks 139a, 139b, 139c, and 139d are connected in series relationship with one another to the output of triode 134. Network 139a comprises a resistor 140a and an inductor 141a which are connected in series relationship between the cathode of triode 134 and the control grid of a triode 142a. The junction between resistor 140a and inductor 141a is connected through a resistor 143a to terminal 136. The control grid of triode 142a is connected to ground through a capacitor 144a. The anode of triode 142a is connected to terminal 130, and the cathode of triode 142a is connected through a resistor 145a to terminal 132. Filter networks 139b, 139c and 139d are identical to network 139a.

The anode of triode 142d is connected through a resistor 150 to terminal 130. The anode of triode 142d is also connected through a capacitor 151 and an inductor 152 to the control grid of a triode 153. The cathode of triode 142d is connected to the control grid of triode 153 through a resistor 154. The control grid of triode 153 is connected through a resistor 158 to terminal 136. The anode of triode 153 is connected to terminal 130, and the cathode of triode 153 is connected through a resistor 155 to terminal 132. The cathode of triode 153 is connected to the first output terminal 156 of the filter network. The second output terminal 157 is connected to ground.

Figure 7:
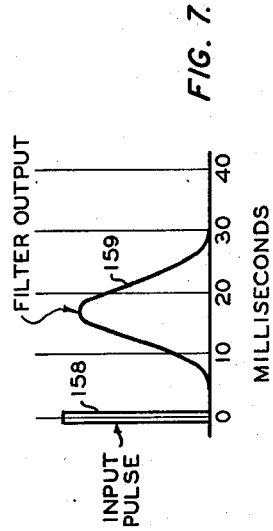
Figure 7 is a graphical representation of operating features of the filter of Figure 6.

The filter network illustrated in Figure 6 has substantially a normal density function response. If a single input pulse, such as 158 of Figure 7, is applied between terminals 125 and 126, the output signal between terminals 156 and 157 represents the normal density curve, 159 of Figure 7, which is defined by the general expression:

$$E_0(t) = Ke^{-(xt)^2}$$

where $E_0(t)$ is the output voltage as a function of time, K is a constant relating to the energy loss through the filter, $t$ is time, $e$ is the base of natural logarithms, and $x$ is a constant relating to the width of the density curve. This filter is particularly effective in smoothing the output signal of amplifier 111 in order to provide a continuous signal, such as shown in the lowermost curve of Figure 4. This is the actual response of filter 115 when energized by the curve $(A+)(B+)-(A-)(B-)$ of Figure 4 where the circuit components of the filter were as follows:

Resistor:
| | | |
|---|---|---|
| 131 | ohms | 5,600 |
| 138 | do | 5,600 |
| 145a | do | 5,600 |
| 145b | do | 5,600 |
| 145c | do | 5,600 |
| 145d | do | 5,600 |
| 155 | do | 5,600 |
| 128 | do | 470,000 |
| 133 | do | 1,000,000 |
| 135 | do | 8,200,000 |
| 143a | do | 8,200,000 |
| 143b | do | 8,200,000 |
| 143c | do | 8,200,000 |
| 143d | do | 8,200,000 |
| 158 | do | 8,200,000 |
| 140a | do | 180,000 |
| 140b | do | 180,000 |
| 140c | do | 180,000 |
| 140d | do | 180,000 |
| 154 | do | 180,000 |
| 150 | do | 5,600 |

Capacitor:
| | | |
|---|---|---|
| 137 | microfarads | 0.05 |
| 144a | do | 0.031 |
| 144b | do | 0.015 |
| 144c | do | 0.0076 |
| 144d | do | 0.0047 |
| 151 | do | 0.003 |

Inductor:
| | | |
|---|---|---|
| 141a | henries | 500 |
| 141b | do | 500 |
| 141c | do | 500 |
| 141d | do | 500 |
| 152 | do | 500 |

Terminal:
| | | |
|---|---|---|
| 130 | volts | +150 |
| 132 | do | −12 |
| 136 | do | −90 |

Triodes: All type ½ 12AT7

The filter of Figure 6 comprises a single pole low pass filter section, resistor 133 and capacitor 137, which is followed by four stages of two pole low pass filter sections 139a, 139b, 139c, and 139d. The output signal of filter section 139d is transmitted through an all pass phase correcting network that is defined by the circuit elements between triodes 142d and 153.

Figure 8A:
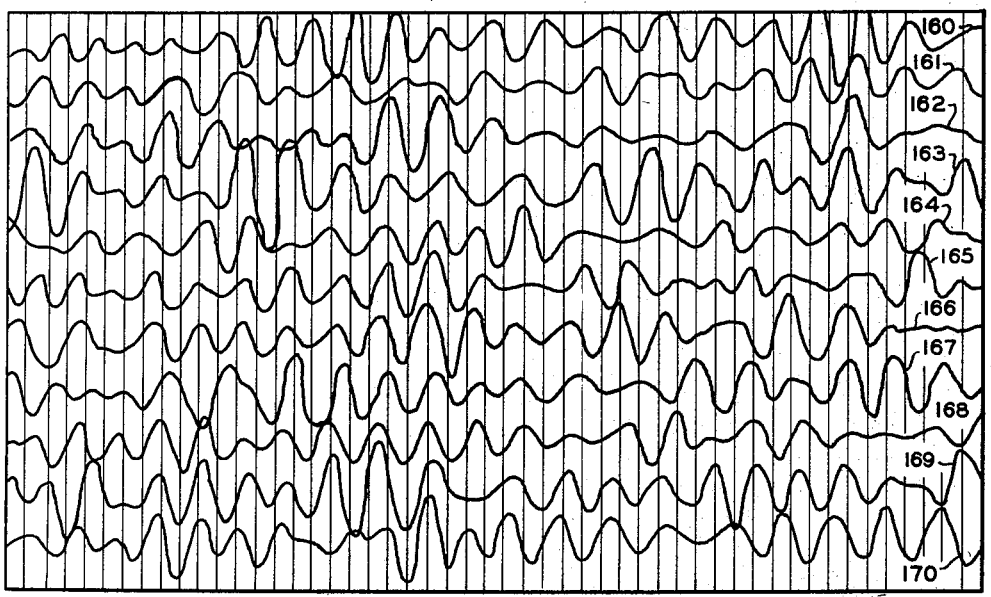
Figures 8a and 8b are graphical representations of original seismic signals and transformed signals obtained by the apparatus of Figure 5, respectively.
Figure 8B:
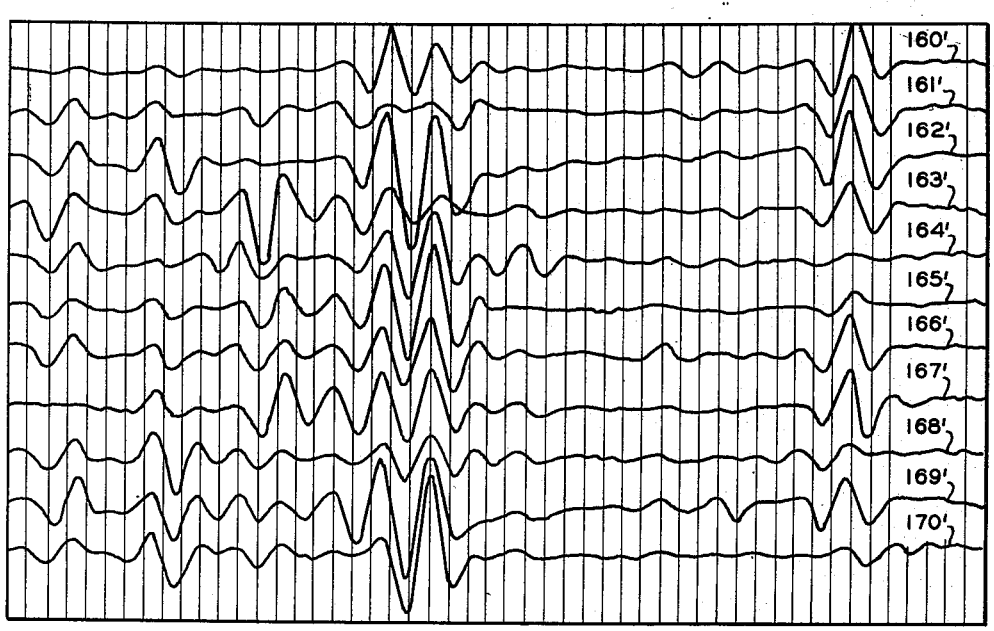

In one specific embodiment of the described seismic signal interpretation procedure, a series of eleven explosive charges were detonated in sequence in shot holes along a common line spaced approximately 300 feet from one another. Vibrations from each of these explosive charges were received by a total of eight seismometers which had their outputs summed by an amplifier, such as 14 in Figure 1 of the drawing. The eleven recorded signals contained considerable amounts of extraneous vibrations, as illustrated by respective curves 160 to 170 of Figure 8a which are reproductions of photographic traces made of original recordings made in the Texas Panhandle. It can be seen that corresponding reflections are difficult, if not impossible, to identify in the eleven curves. These eleven signals were then summed to provide a single composite record, such as is illustrated by drum 31 of Figure 2. Each initial signal was then multiplied by the composite curve in the manner of this invention using the apparatus of Figure 5 so as to obtain the curves 160′ to 170′ which are shown in Figure 8b. The curves of Figure 8b are reproductions of photographic recordings of the final transformed records. It should be evident from an inspection of the curves of Figure 8b that the common reflections on the several curves are readily identifiable. The random noise vibrations are greatly reduced.

In order to simplify the explanation, it has been assumed that the several seismometer signals were obtained from vibrations of substantially equal travel paths. This is not necessary, however. Signals representative of different lengths of travel paths can be combined by incorporating suitable delays at the time of the combination to compensate for different path angularities. This can readily be accomplished by the adjustable recording and reproducing heads associated with the magnetic tape drums. Furthermore, it is usually necessary to compensate for differences in elevation and thicknesses of the weathered layer. This can also be accomplished by incorporating suitable delays in the original combination of records, as is well known by those skilled in the art. In the system illustrated in Figure 1, it is assumed that the seismometers associated with each amplifier are sufficiently close together that no corrections are needed for angularity of path. However, corrections can be made if the seismometers are spaced sufficiently far from one another to require such corrections.

While the signal interpretation method has been described in conjunction with multiplying individual signals by the sum of a plurality of signals, such a procedure is not necessary. A first signal can be multiplied directly by a second to provide useful information in some situations.

Figure 9:
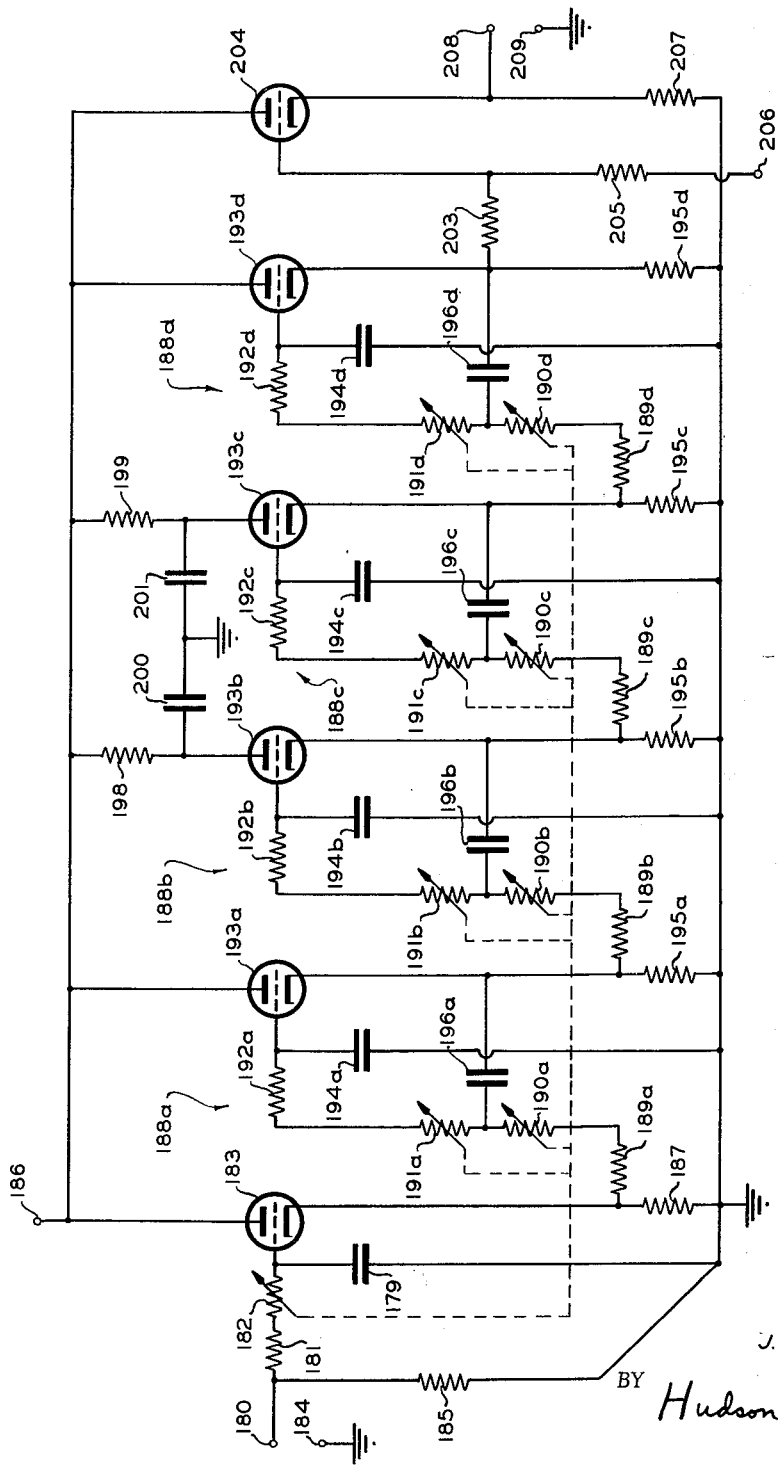
Figure 9 is a schematic circuit drawing of a second embodiment of the interpolation filter of this invention.

In Figure 9 there is shown a second embodiment of the filter of this invention. The first input terminal 180 is connected through a resistor 181 and a variable resistor 182 to the control grid of a triode 183. The second input terminal 184 is connected to ground. Terminal 180 is also connected to ground through a resistor 185. The anode of triode 183 is connected to a positive potential terminal 186, and the cathode of triode 183 is connected to ground through a resistor 187.

Four substantially identical filter networks 188a, 188b, 188c and 188d are connected in series relationship with one another to the output of 183. Network 188a comprises a resistor 189a, variable resistors 190a and 191a, and a resistor 192a connected between the cathode of triode 183 and the control grid of a triode 193a. A capacitor 194a is connected between the control grid of triode 193a and ground. The anode of triode 193a is connected to terminal 186, and the cathode of triode 193a is connected to ground through a resistor 195a. A capacitor 196a is connected between the junction between resistors 190a and 191a and the cathode of triode 193a. Filter networks 188b, 188c and 188d are substantially identical to network 188a. The anodes of triodes 193b and 193c are connected to terminal 186 through resistors 198 and 199, respectively. The anodes of these triodes are also connected to ground through capacitors 200 and 201, respectively.

The cathode of triode 193d is connected through a resistor 203 to the control grid of a triode 204. The anode of triode 204 is connected to terminal 186, and the cathode of triode 204 is connected to ground through a resistor 207. The control grid of triode 204 is connected through a resistor 205 to a negative potential terminal 206. The cathode of triode 204 is connected to a first output terminal 208, the second output terminal 209 being connected to ground.

Variable resistors 182, 190a, 191a, 190b, 191b, 190c, 191c, 190d and 191d are mechanically connected to one another so that all can be increased or decreased in value in unison. In one specific embodiment of this filter, each of these resistors had a total value of 100,000 ohms. The other circuit components had values as follows:

Resistor:
```
181 _____ohms__  34,700
185 _____do____   5,100
187 _____do____  10,000
195a _____do____  10,000
195b _____do____  10,000
195c _____do____  10,000
195d _____do____  10,000
189a _____do____ 156,000
189b _____do____ 162,000
189c _____do____ 171,000
189d _____do____ 167,000
192a _____do____ 195,000
192b _____do____ 187,000
192c _____do____ 163,000
192d _____do____ 167,000
198 _____do____   4,700
199 _____do____   4,700
```

Capacitor:
```
179 _____microfarads__  0.034
194a _____do____  0.00372
194b _____do____  0.00158
194c _____do____  0.000753
194d _____do____  0.000345
196a _____do____  0.00435
196b _____do____  0.0082
196c _____do____  0.0091
196d _____do____  0.01266
```

Terminal:
```
186 _____volts__ +150
206 _____do____   −90
```

Triodes:
```
183 and 193a _____ Type 5687
193b and 193c _____ Type 6201
193d and 204 _____ Type 6201
```

The filter network of Figure 9 can readily be tuned by adjustment of the ganged resistors in order to accommodate signals of different configurations. For example, an increase of the values of the ganged resistors results in the response of the network to a single input pulse being broadened with respect to time. A decrease in resistance has the opposite effect. The network is smoothly adjustable. This network is particularly adapted for use in a number of seismic filtering operations because its response to a unit input pulse is quite similar to the filtering characteristics of the earth to earth to a seismic impulse. The adjustment feature permits the network to be "tuned" to different types of earth formations. The response of the network of Figure 9 to a unit input pulse is substantially the same as that of the network of Figure 6.

While the invention has been described in conjunction with present preferred embodiments, it should be evident that it is not limited thereto.

What is claimed is:

1. A filter network comprising first and second input terminals; first and second tubes, each having an anode, a cathode and a control grid; first and second resistors connected in series relationship between said first input terminal and the control grid of said first tube; a first capacitor connected between the control grid of said first tube and said second input terminal; a second capacitor connected between the cathode of said first tube and the junction between said first and second resistors; third and fourth resistors connected in series relationship between the cathode of said first tube and the control grid of said second tube; a third capacitor connected between the control grid of said second tube and said second input terminal; and a fourth capacitor connected between the cathode of said second tube and the junction between said third and fourth resistors, the cathode of said second tube being the first output terminal of said network, the second output terminal of said network being said second input terminal.

2. The filter network of claim 1 wherein said first, second, third and fourth resistors are variable; and further comprising means to increase and decrease all of said resistors in unison.

3. A filter network comprising first and second input terminals; a first tube having an anode, a cathode and a control grid; a first resistor connected between said first input terminal and the control grid of said first tube; a first capacitor connected between the control grid of said first tube and said second input terminal; a plurality of filter units connected in series relationship, each of said filter units comprising second and third resistors connected in series relationship, a second tube having an anode, a cathode, and a control grid, the end terminal of said third resistor which is not connected to said second resistor being connected to the control grid of said second tube, a second capacitor connected between the control grid of said second tube and said second input terminal, and a third capacitor connected between the cathode of said second tube and the junction between said second and third resistors; and means connecting the end terminal of the second resistor which is not connected to the third resistor of the first of said units to the cathode of said first tube, the cathode of the second tube of the last of said units and said second input terminal forming the output terminals, respectively, of said network.

4. The filter network of claim 3 wherein said first, second and third resistors are variable; and further comprising means to increase and decrease all of said resistors in unison.

5. A filter network comprising first and second input terminals; a first tube having an anode, a cathode and a control grid; a first resistor connected between said first input terminal and the control grid of said first tube; a first capacitor connected between the control grid of said first tube and said second input terminal; a second resistor having the first terminal thereof connected to the cathode of said first tube; means for applying a direct potential between the anode of said first tube and the second terminal of said second resistor so that the anode of said first tube is positive with respect to the cathode thereof; a plurality of filter units connected in series relationship, each of said filter units comprising third and fourth resistors connected in series relationship, a second tube having an anode, a cathode and a control grid, the end terminal of said fourth resistor which is not connected to said third resistor being connected to the control grid of said second tube, a second capacitor connected between the control grid of said second tube and said second input terminal, and a third capacitor connected between the cathode of said second tube and the junction between said third and fourth resistors, a fifth resistor have the first terminal thereof connected to the cathode of said second tube, and means for applying a direct potential between the anode of said second tube and the second terminal of said fifth resistor so that the anode of said second tube is positive with respect to the cathode thereof; means for connecting the end terminal of the third resistor which is not connected to the fourth resistor of the first of said units to the cathode of said first tube, the cathode of the second tube of the last of said units and said second input terminal forming the output terminals, respectively, of said network.

6. The filter network of claim 5 wherein said first, third and fourth resistors are variable; and further comprising means to increase and decrease all of said first, third and fourth resistors in unison.

References Cited in the file of this patent
UNITED STATES PATENTS

| | | |
|---|---|---|
| 2,350,869 | Bliss | June 6, 1944 |
| 2,735,007 | McCurdy | Feb. 14, 1956 |